United States Patent
Cheng et al.

(10) Patent No.: US 9,468,037 B2
(45) Date of Patent: Oct. 11, 2016

(54) ROBUST TRANSMISSION ON DOWNLINK DISCONTINUOUS TRANSMISSION CARRIER

(71) Applicant: Telefonaktiebolaget L M Ericsson (Publ), Stockholm (SE)

(72) Inventors: Jung-Fu Cheng, Fremont, CA (US); Sorour Falahati, Stockholm (SE); Mattias Frenne, Uppsala (SE); Havish Koorapaty, Saratoga, CA (US); Daniel Larsson, Vallentuna (SE); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 256 days.

(21) Appl. No.: 14/354,901

(22) PCT Filed: Mar. 7, 2014

(86) PCT No.: PCT/SE2014/050284
§ 371 (c)(1),
(2) Date: Apr. 28, 2014

(87) PCT Pub. No.: WO2015/034411
PCT Pub. Date: Mar. 12, 2015

(65) Prior Publication Data
US 2015/0312958 A1  Oct. 29, 2015

Related U.S. Application Data

(60) Provisional application No. 61/873,180, filed on Sep. 3, 2013.

(51) Int. Cl.
*H04W 76/04* (2009.01)
*H04B 7/04* (2006.01)
(Continued)

(52) U.S. Cl.
CPC ......... *H04W 76/048* (2013.01); *H04B 7/0413* (2013.01); *H04B 7/0686* (2013.01); *H04L 5/00* (2013.01); *H04L 5/0048* (2013.01); *H04L 5/0055* (2013.01); *H04W 74/006* (2013.01)

(58) Field of Classification Search
None
See application file for complete search history.

(56) References Cited

U.S. PATENT DOCUMENTS

| | | |
|---|---|---|
| 2011/0044250 A1* | 2/2011 | Han ............... H04B 7/0689 370/328 |
| 2012/0275335 A1* | 11/2012 | Huang ............ H04W 52/0206 370/252 |

(Continued)

FOREIGN PATENT DOCUMENTS

WO  2011103186 A2  8/2011

OTHER PUBLICATIONS

International Search Report and Written Opinion dated Sep. 25, 2014 for International Application No. PCT/SE2014/050284, International Filing Date—Mar. 7, 2014 consisting of 14-pages.

(Continued)

*Primary Examiner* — Dang Ton
*Assistant Examiner* — Ronald h Davis
(74) *Attorney, Agent, or Firm* — Christopher & Weisberg, P.A.

(57) ABSTRACT

A method and system for downlink discontinuous transmission are provided. In one embodiment, a base station includes a memory, a processor and a transmitter. The memory stores information to be transmitted in a subset of sub frames to a UE. The information includes transmission mode configuration information. The processor operates to configure the transmitter according to a selected transmission mode configuration that includes one of a transmit diversity mode and a MIMO mode, and configures the transmitter to transmit discontinuously and include CRS in only a subset of sub frames.

24 Claims, 8 Drawing Sheets

(51) Int. Cl.
*H04L 5/00* (2006.01)
*H04B 7/06* (2006.01)
*H04W 74/00* (2009.01)

(56) References Cited

U.S. PATENT DOCUMENTS

| | | | | |
|---|---|---|---|---|
| 2013/0188531 A1* | 7/2013 | Zhang | ................... | H04L 5/0007 370/280 |
| 2013/0194931 A1 | 8/2013 | Lee et al. | | |
| 2013/0301450 A1* | 11/2013 | Geirhofer | .............. | H04B 7/024 370/252 |
| 2013/0343299 A1* | 12/2013 | Sayana | ................ | H04B 7/0417 370/329 |

OTHER PUBLICATIONS

Ericsson et al.—Title: "Dynamic eNB Downlink DATX—Way Forward", 3GPP Draft; R1-133995 Ag 7.2.1.1, XP050717074, Retrieved from the Internet at: URL:http://www.3gpp.org/ftp/tsg ran/WG1 RL 1/TSGR1 74/Docs/—3rd Generation Partnership Project (3GPP), Mobile Competence Centre, 650, Route Des Lucioles; F-06921 Sophia-Antipolis; France Aug. 29, 2013, (15-pages).
3GPP TSG RAN WG1 Meeting #74bis held in Guangzhou, China, Source: MCC Support: Title: "Draft Report of 3GPP TSG RAN WG1 #74 v0.1.0 (Barcelona, Spain, Aug. 19-23, 2013", Document for Comments, 3rd Generation Partnership Project (3GPP), Mobile Competence Centre, 650, Route Des Lucioles; F-06921 Sophia-Antipolis; France, XP050717123A consisting of 114 pages.

* cited by examiner

■ CRS
▨ PCFICH/PDCCH/PHICH
☰ BCH/PSS/SSS
▦ PDSCH (incl ePDCCH)
☐ "Hole"

ROBUST TRANSMISSION ON DOWNLINK DISCONTINUOUS TRANSMISSION CARRIER

FIELD

The present application relates generally to radio transmissions in a wireless communication system, and more particularly to control signaling on a downlink discontinuous transmission carrier.

BACKGROUND

Long term evolution (LTE) wireless communication systems use orthogonal frequency division multiplexing (OFDM) in the downlink (base station to user equipment) and discrete Fourier transform (DFT)-spread OFDM in the uplink (user equipment to base station). The basic LTE downlink physical resource can thus be seen as a time-frequency grid 2 as illustrated in FIG. 1, where each resource element (RE) 6 corresponds to one OFDM subcarrier 4 during one OFDM symbol interval. In the time domain, LTE downlink transmissions are organized into radio frames 10 of 10 ms, each radio frame consisting of ten equally-sized sub frames 8 of length Tsubframe=1 ms, as shown in FIG. 2.

Furthermore, the resource allocation in LTE is typically described in terms of resource blocks (RB), where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each sub frame the base station transmits control information indicating to which terminals data is transmitted and upon which resource blocks the data is transmitted in the current downlink sub frame. This control signaling is performed via physical channels such as the physical control channel (PDCCH), physical control format indicator channel (PCFICH), and physical hybrid automated request indicator channel (PHICH). The control signaling that indicates the target terminal(s) and the resource blocks is typically transmitted in the first 1, 2, 3 or 4 OFDM symbols in each sub frame, across the system bandwidth. The number n=1, 2, 3 or 4 in which the control signaling is transmitted is known as the Control Format Indicator (CFI) transmitted in the PCFICH.

In LTE Release.11 of the $3^{rd}$ generation partnership project (3GPP) standard, an enhanced PDCCH (EPDCCH) was introduced which does not map a control message across the system bandwidth but instead in a limited (N=2, 4, 8) number of physical resource block (PRB) pairs known as the EPDCCH set. The location of these PRB pairs in the set is configured to the UE using radio resource control (RRC) signaling. A Rel.11 user equipment (UE) can be configured with one or two EPDCCH sets for its control signaling. The EPDCCH spans the whole sub frame. However the starting OFDM symbol for EPDCCH has to be s=n+1 where n is the control format indicator (CFI), to avoid collision between the PDCCH/PCFICH/PHICH and the EPDCCH. The value of s can either be obtained from detecting CFI (i.e. n) or it can be configured to a fixed value by radio resource control (RRC) signaling. The EPDCCH cannot (in Rel.11) be used to transmit broadcast control messages. Only UE specific scheduling control messages can be transmitted. This is because only the UE specific search space (USS) is monitored on EPDCCH. Hence, the PDCCH is used for broadcast control messages (common search space) irrespectively of whether EPDCCH is configured to a Rel.11 UE or not. A pre-Rel.11 UE uses the PDCCH for both common and UE specific search space monitoring.

The downlink sub frame also contains a number of different reference symbols, which are known to the receiver and used for coherent demodulation of, for example, the control information. The PDCCH uses common reference symbols (CRS) for demodulation and these can, in Rel.11, have 1, 2 or 4 antenna ports. These common reference symbols span the whole system bandwidth, i.e. they are present in all PRB pairs, and are present in all sub frames even if no PDCCH is transmitted. The EPDCCH uses UE specific demodulation reference symbols (DMRS) for demodulation. These reference symbols are only present in the PRB pairs of the EPDCCH set if there is an EPDCCH transmission in the set in the specific sub frame. In case there is no EPDCCH transmission, the UE specific reference symbols (RS) are not transmitted.

For the physical downlink shared channel (PDSCH), there are ten transmission modes (TM) defined in LTE, as shown in Table 1 below. Each TM has two transmission schemes, where the second scheme is a "fallback scheme" that generally has only a single layer transmission. Some of the transmission modes use CRS-based transmit diversity for robustness, i.e., CRS is used as a demodulation reference. Scheme 2 is used when scheduling using downlink control information (DCI) format 1A which can be used in all TMs. Thus, scheme 2 is the transmission scheme that can be used during RRC reconfiguration of the TM for a UE. Some TMs use the CRS for PDSCH demodulation and others use the UE specific RS, also known as DMRS, as for example TM10. In a multi-broadcast single frequency network (MB-SFN), sub frames only have CRS in the first OFDM symbol. In non-MBSFN sub frames, CRS is always used for scheme 2. However, TM9 and TM10 use UE specific RS whenever the sub frame is a MBSFN sub frame.

TABLE 1

Available transmission modes for a REL.11 terminal

| Transmission mode | Feature | RS used for demodulation of scheme 1 | RS used for demodulation of scheme 2 | RS/RE used for channel feedback |
|---|---|---|---|---|
| 1 | Single antenna | Common RS | Common RS | Common RS |
| 2 | Transmit diversity | Common RS | Common RS | Common RS |
| 3 | Open loop MIMO, max 4 layers | Common RS | Common RS | Common RS |
| 4 | Closed loop MIMO, max 4 layers | Common RS | Common RS | Common RS |
| 5 | MU-MIMO, max 1 layer, max 2 UEs | Common RS | Common RS | Common RS |
| 6 | Closed loop MIMO, max 1 layer | Common RS | Common RS | Common RS |
| 7 | TDD MIMO, max 1 layer | UE specific RS | Common RS | Common RS |
| 8 | TDD MIMO, max 2 layers | UE specific RS | Common RS | Common RS |

TABLE 1-continued

Available transmission modes for a REL.11 terminal

| Transmission mode | Feature | RS used for demodulation of scheme 1 | RS used for demodulation of scheme 2 | RS/RE used for channel feedback |
|---|---|---|---|---|
| 9 | Closed loop MIMO, max 8 layers | UE specific RS | Common RS or UE specific RS | CSI-RS |
| 10 | Closed loop MIMO + CoMP, max 8 layers | UE specific RS | Common RS or UE specific RS | CSI-RS + IMR |

Also, RSs used for channel state information (CSI) feedback differ among the transmission modes. TM9 and TM10 utilize special channel state information RS (CSI-RS), which is more sparse than the CRS and cannot be used for demodulation. Instead, CSI-RS is used primarily for measuring channel state information. In TM10, the interference measurement resource (IMR) is introduced, which is a set of resource elements (REs) in which the UE is mandated to measure the interference used in computing the channel state information (CSI) report. For TM1-TM9, the interference measurement is unspecified, but most UE implementations use residual interference on the common reference signal (CRS) to create the interference covariance estimate.

The demodulation reference signal (DMRS) is only present in the PRB pairs containing PDSCH, while CRS is always present in all PRB pairs and all sub frames. A PRB pair 14 in a downlink system with CFI=3 OFDM symbols as PDCCH/PCFICH/PHICH control is illustrated in FIG. 3. FIG. 3 also shows the CRS 12.

UEs configured in TM10 and configured with EPDCCH use DMRS for demodulation of both PDSCH and EPDCCH but use the CRS for demodulating the PDCCH/PCFICH and PHICH. Furthermore, the use of PHICH is not strictly necessary, since HARQ indication for the uplink can be transmitted using the EPDCCH instead. Also, the PCFICH, which indicates the length of the region containing PDCCH, is unused in case the EPDCCH and PDSCH start position is configured by RRC. So the PHICH and PCFICH can actually be unused and are not needed to be received at all for terminals configured in TM10 (Rel.11 capability is required to support TM10). Thus, there is no reason in this case to transmit the PHICH and PCFICH.

Hence, only PDCCH is necessary to be transmitted to convey broadcast information. However, in case of carrier aggregation, only the primary cell (Pcell) is transmitting broadcast information, hence the PDCCH need not be present on the secondary cell (Scell). So in the case of an Scell, there is no PDCCH/PCFICH/PHICH needed. Thus, CRS are not used at all for demodulation purposes for the secondary cells.

There are also other means for providing broadcast information in the control plane (C-plane) to the UE under discussion by the 3 GPP standards body, such as dual connectivity. Hence, in some cases being considered by the 3GPP, there is no need for CRS for demodulation purposes. In these scenarios, where UEs get C-plane information from other sources, with only TM10 configured UEs on a carrier, the CRS is present in all sub frames and creates overhead since these REs used for CRS cannot be used for PDSCH or EPDCCH. Furthermore, the CRS creates unnecessary interference in a PBR pair even if the PRB pair is unused, i.e., not scheduled on the PDSCH.

A new carrier type, has been proposed that contains either no CRS at all or much less CRS either in frequency (by, for example, a reduction of the bandwidth the CRS covers to be smaller than the carrier bandwidth) or in time (by, for example, not transmitting any CRS in some pre-defined sub frames) or in both frequency and time, as compared to a legacy carrier. In the proposed new carrier type, CRS is transmitted in sub frame 0 and sub frame 5 for frequency and time synchronization tracking and radio resource management (RRM) measurements, but is not used for channel estimation or demodulation.

As shown in Table 1, a UE configured in TM9 or TM10 uses CSI-RS for channel state information feedback and UE specific RS for demodulation in case of scheme 1. For the "fallback" scheme 2, CRS is used for demodulation unless the sub frame is an MBSFN sub frame, in which case a single UE specific RS is used (port 7). Even though these two TMs are based on UE specific RS for demodulation, they utilize CRS for their channel analyzer estimates, at least for Doppler frequency and Doppler shift estimation.

A modified TM10, known as enhanced TM10 (eTM10) or TM11, has also been proposed. UEs configured in this new TM and receiving PDSCH can be dynamically configured (by an EPDCCH or PDCCH message) in a given sub frame to start the PDSCH at OFDM symbol 0 and/or to assume that no CRS are present in the sub frame. Hence, the overhead from CRS is removed. The CRS is overhead since it is not used by the UE either for feedback or demodulation. This leads to better spectral efficiency and higher UE throughput. Alternatively, when PDCCH and CRS are present, their presence can be indicated in downlink control signaling so that the PDSCH to RE mapping avoids the legacy control region and the CRS REs. Thus, the eTM10 mode, when combined with sub frame level discontinuous transmissions (DTX), allows UEs to receive DMRS based transmissions without any CRS in the sub frame, and for CRS transmissions to be turned off when there is no data sent in a sub frame. This enhanced TM10 mode and sub frame level DTX combination provides the possibility of fast on/off behavior of the base station transmissions and can be used to operate without CRS to achieve the same result as the proposed new carrier type when all UEs in the cell are capable of using these enhancements. Furthermore such an enhanced transmission mode can seamlessly accommodate one or more CRS ports in any sub frame.

Based on some current proposals, the CRS may be removed on all sub frames except sub frame 0 and 5 in a radio frame (containing 10 sub frames). The CRS is used in these sub frames to support time and frequency synchronization and for RRM measurements. In all other sub frames, the CRS are not transmitted. This enables downlink discontinuous transmission (DL DTX) in cases where there is no UE to be scheduled and there are no legacy UEs active in the cell (since the legacy UEs require CRS to be present in every sub frame).

Thus, in the enhanced TM10 proposal (eTM10), the CRS is absent from sub frames except for sub frames 0 and 5. This means that the channel analyzer that relies on CRS for at least Doppler related parameter estimation will have reduced performance. Also, the fallback transmission scheme, i.e. scheme 2, currently assumes CRS for demodulation when the sub frame is a non-MBSFN sub frame.

Another problem with TM10 is that it does not provide for robust transmission, such as transmit diversity and open loop MIMO using DMRS. For instance, the PDSCH is transmitted using a single antenna port. Hence, no transmit diversity is possible. If DL DTX is used on a carrier, then robust CRS based TMs like TM2 and TM3 may not be used. This is particularly a drawback in cases where feedback is unavailable due to large CSI-RS periodicity (which is likely to maximize the DTX gain), or when UE speed is high with respect to the CSI-RS periodicity.

A lack of CRS and/or PDCCH will make the proposed new type of carrier or transmission mode inaccessible by legacy release UEs when deployed, i.e., the proposed new type of carrier and transmission mode are not backward compatible. The proposed new type of carrier and transmission mode are referred to as carrier type or transmission mode type B. Carrier type or transmission mode A (legacy carrier or transmission mode) and carrier type or transmission mode B are illustrated in FIG. 4 and FIG. 5, respectively. FIG. 4 shows channels containing CRS 16, PCFICH/PDCCH/PHICH 18, BCH/PSS/SSS 19, and PDSCH 20 (which includes eDPCCH). FIG. 5 shows that the CRS 16 are restricted to a sub frame 22. A UE that supports carrier type or transmission mode B also supports carrier type or transmission mode A and these UEs are referred to as UE B. Legacy UEs are referred to as type A UEs.

A network typically configures the UE to assist the reception of various signals and/or channels based on different types of reference signals including, for example, CRS (represented as antenna ports 0-3), DMRS, i.e. antenna ports 7-14, CSI-RS, i.e. antenna ports 15-22. Reference symbols may possibly be exploited for estimation of propagation parameters and preferred transmission properties to be reported by the UEs to the network, e.g., for link adaptation and scheduling. In general, the channel from each antenna port to each UE receive port is substantially unique. However, some statistical properties and propagation parameters may be common to different antenna ports, depending on whether the different antenna ports originate from the same point or not. Such properties include, for example, the received power level for each port, the delay spread, the Doppler spread, the received timing (i.e., the timing of the first significant channel tap) and the frequency shift.

Channel estimation algorithms perform a three step operation. A first step includes the estimation of some of the statistical properties of the channel such as average delay spread and Doppler shift. This step can be done several sub frames before receiving data, and is commonly performed using a channel analyzer in the UE. The estimation can also be done based on a first type of reference signal that is different from a second type of reference signal, for which the estimate is needed, if the reference signals belonging to the two types are quasi co-located. This step can also be done by combining estimates from several sub frames, using a channel property tracking algorithm. A second step includes generating a channel estimation filter based on such estimated properties or parameters. A third step, which is carried out only when the UE is receiving data or control data, and needs a channel estimate for coherent demodulation, includes applying the estimation filter to the received signal in order to obtain the channel estimates. The filter may be equivalently applied in the time or frequency domain or both (jointly). Some channel estimator implementations may not be based on the three steps described above, but still exploit the same principles. For instance, the three steps may be carried out on reference signals (RS) within a single sub frame only.

Accurate estimation of the filter parameters in the first step leads to improved channel estimation. Even though the UE may obtain filter parameters from observation of the channel over a single sub frame and for one RS port, improved filter parameters may result in improved estimation accuracy by combining measurements associated with different antenna ports, i.e., different RS transmissions, sharing similar statistical properties. Furthermore, the channel estimation accuracy may be improved by combining RSs associated with multiple physical resource blocks (PRBs). Note that the network is typically aware of which RS ports are associated with channels with similar properties, based on knowledge of how antenna ports are mapped to physical points.

The UE is also aware a-priori of such information because of the principle of quasi co-location (QCL) as specified in Rel.11. A UE may not assume that two antenna ports are QCL unless specified otherwise. The following antenna ports can be assumed to be QCL with respect to the listed properties.

In TM1-TM9 and in case of TM10 with QCL configured to type A:
    CRS, DMRS and CSI-RS are QCL with respect to Doppler spread, Doppler shift, delay spread and average delay;
    All CRS ports are also mutually QCL with respect to average gain; and
    All CSI-RS ports are also mutually QCL with respect to average gain;
In TM10 with QCL configured to type B:
    DMRS and CSI-RS are QCL with respect to Doppler spread, Doppler shift, delay spread and average delay; and
    CSI-RS and CRS are QCL with respect to Doppler spread and Doppler shift.

In the TM10 Type B configuration (which is configured using RRC signaling), the CRS is QCL with CSI-RS and DMRS only with respect to Doppler shift and Doppler spread. The channel analyzer in the UE can thus estimate these parameters from the CRS and then use the estimated parameters when determining the channel estimation filter. However, the delay spread and average delay must be estimated using the CSI-RS since the CRS is not QCL with the DMRS for these parameters. For TM1-9, the channel analyzer can estimate all the parameters from CRS, interpolated across multiple sub frames, prior to receiving any scheduled data.

Each antenna port is represented by a set of RS in the OFDM time frequency grid, as shown FIG. 3. When the channel estimator filter has been determined according to step 1 and step 2 discussed above, the third step of channel estimation should be performed. The channel estimation is improved when more resource elements (REs) are taken into account in the interpolation/extrapolation filtering of the estimates obtained based on the REs containing the corresponding RS. However, there are some limitations on the extent to which the filtering in channel estimation step 3 can be done:
    A channel estimator for CRS may use CRS RE from any downlink sub frame and from any RB in each sub frame;
    A channel estimator for DMRS may use DMRS RE within one sub frame only and only within a group of RBs known as the physical resource group (PRG). The PRG is 1, 2 or 3 RB depending on the system bandwidth, transmission mode and whether PMI feedback is configured; and
    A channel estimator for CSI-RS may use CSI-RS RE within the sub frame only and from any RB in the sub frame.

A terminal that does not rely on CRS at all has also been proposed. However, when the carrier is operated without CRS, which provides performance gains, most transmission modes become unavailable (only TM9 or TM10 is possible) since they rely on CRS for demodulation and channel state information feedback. This implies that transmit diversity transmission (TM2) or open loop MIMO (TM3) becomes unavailable. Transmit diversity and open loop MIMO are particularly useful in high speed scenarios and in other scenarios where the closed loop feedback modes have poor performance as when the periodicity of the CSI-RS is long to minimize the downlink transmissions and maximize the DTX lengths. Further, when DTX of downlink sub frames is applied, CRS is no longer available in every sub frame and transmission modes that use CRS may not be available.

Therefore, current proposals do not provide for use of discontinuous transmission modes where CRS are provided in only some sub frames when a transmission mode is one of transmit diversity mode and open loop multiple-input-multiple-output (MIMO) mode.

SUMMARY

Methods and systems for achieving robust transmission modes on a downlink discontinuous transmission carrier are presented. According to one aspect, embodiments provide a method for using common reference signals, CRS, in conjunction with discontinuous mode transmission from the base station to a user equipment. The method includes selecting a transmission mode, the selection being one of a plurality of transmission modes that include at least one of a transmit diversity mode and an open loop multiple-input-multiple-output, MIMO, mode. Data and CRS are transmitted in sub frames of a frame in accordance with the selected transmission mode. The discontinuous transmission omits transmission of data and CRS in specified sub frames. At least one CRS is included in the discontinuous transmission. The CRS are transmitted in only a pre-determined subset of the sub frames of the frame and in additional sub frames of the frame where there is transmission of data using a selected transmission mode.

According to this aspect, in some embodiments, the selected transmission mode, TM, is one of TM2 and TM3 defined for long term evolution, LTE. In some embodiments, the UE is signaled to inform the UE as to which sub frames contain the CRS. In some embodiments, the UE is signaled as to which of one of two reference symbol types the UE is to use for channel state information feedback, the first type being CRS and the second type being channel state interference reference symbols, CSI-RS. In some embodiments, the UE is signaled to configure the UE to receive in a discontinuous transmission mode. In some embodiments, the UE is informed whether CRS is to be used for demodulation is present in one of each scheduled physical resource block, PRB, and a whole system bandwidth of a current sub frame. In some embodiments, a default channel state information reference symbol, CSI-RS, configuration and an interference measurement resources, IMR, configuration are transmitted to allow the UE to perform CSI measurement and allow the UE to provide CSI feedback for transmission modes that use CRS for demodulation. In some embodiments, the default CSI-RS and IMR configurations are signaled in a broadcasted control message. In some embodiments, the default CSI-RS and IMR configurations are transmitted in a physical downlink shared channel, PDSCH.

According to another aspect, embodiments provide a base station for downlink discontinuous transmission. The base station includes a memory, a transmitter and a processor. The memory is configured to store a common reference symbol, CRS, and transmission mode configuration information. The transmitter is configured to transmit data and CRS discontinuously in sub frames in accordance with a selected transmission mode, the discontinuous transmission omitting transmission of data and CRS in specified sub frames. The processor is configured to select a transmission mode from a plurality of transmission modes that include at least one of a transmit diversity mode and an open loop multiple-input-multiple-output, MIMO, mode. The processor is further configured to include in the discontinuous transmission at least one CRS, the CRS being transmitted in only a pre-determined subset of the sub frames and in additional sub frames where there is transmission of data using a selected transmission mode.

According to this aspect, in some embodiments, the selection of the transmission mode, TM, is one of TM2 or TM3 defined for long term evolution, LTE. In some embodiments, the base station is further configured to signal a user equipment, UE, to inform the UE as to which sub frames contain the CRS. In some embodiments, the base station is further configured to transmit a signal indicating to a user equipment, UE, which one of CRS and channel state information reference symbols, CSI-RS, are to be used for channel state information feedback. In some embodiments, the base station is further configured to signal a user equipment, UE, to configure the UE to receive in a discontinuous transmission mode. In some embodiments, the base station indicates to a user equipment, UE, whether CRS to be used for demodulation is present in one of each scheduled physical resource block, PRB, pair and a whole system bandwidth of a current sub frame. In some embodiments, the base station is further configured to transmit a default channel state information reference symbol, CSI-RS, and an interference measurement resource, IMR, to allow the user equipment, UE, to perform CSI measurement and provide CSI feedback for transmission modes that use CRS for demodulation.

According to another aspect, embodiments provide a method at a UE for reception of discontinuous transmission from a base station. The method includes storing common reference symbols, CRS, and transmission mode configuration information, where a transmission mode is selected from a plurality of transmission modes that include at least one of a transmit diversity mode and an open loop multiple-input-multiple-output, MIMO, mode. Discontinuous transmissions are received that include the stored CRS in a selected subset of sub frames. Channel estimation is performed based on one of CRS and channel state information symbols, CSI-RS.

According to this aspect, in some embodiments, channel state information estimation is performed based on at least one of the CRS in the selected subset of sub frames and the CRS in sub frames where the UE is scheduled to use a CRS based transmission scheme, and the UE is precluded from CRS-based CSI estimation in other sub frames. In some embodiments, channel state information, CSI, feedback is performed based on CSI-RS and demodulation is performed using CRS. In some embodiments, the method includes assuming downlink discontinuous transmissions and presence of CRS in the selected subset of sub frames. In some embodiments, the method includes assuming that CRS for channel estimation functions are only in sub frames where the UE has been scheduled. In some embodiments, interpolation of acquired channel estimates using CRS between sub frames is disabled.

According to another aspect, embodiments provide a UE for reception of discontinuous transmissions from a base station. The UE includes a memory, a receiver, and a processor. The memory is configured to store common reference symbols, CRS, and transmission mode configuration information. A transmission mode is selected from a plurality of transmission modes that include at least one of a transmit diversity mode and an open loop multiple-input-multiple-output, MIMO, mode. The receiver is configured to receive discontinuous transmissions, the discontinuous transmissions including the stored CRS in a selected subset of sub frames. The processor is configured to perform channel estimation based on one of CRS and channel state information reference symbols, CSI-RS.

According to this aspect, in some embodiments, the processor is further configured to perform channel state information, CSI, estimation based on at least one of the CRS in the selected subset of sub frames and the CRS in sub frames where the UE is scheduled to use a CRS based transmission scheme. In these embodiments the UE may be precluded from CRS-based CSI estimation in other sub frames. In some embodiments, the processor is further configured to perform channel state information, CSI, feedback based on CSI-RS when the receiver is configured to perform demodulation using CRS. In some embodiments, the processor is further configured to assume downlink discontinuous transmissions and presence of CRS in the selected subset of sub frames. In some embodiments, the UE is further configured to assume that CRS for channel estimation functions are only in sub frames where the UE has been scheduled. In some embodiments, interpolation of acquired channel estimates using CRS between sub frames is disabled.

DETAILED DESCRIPTION

Figure 1:
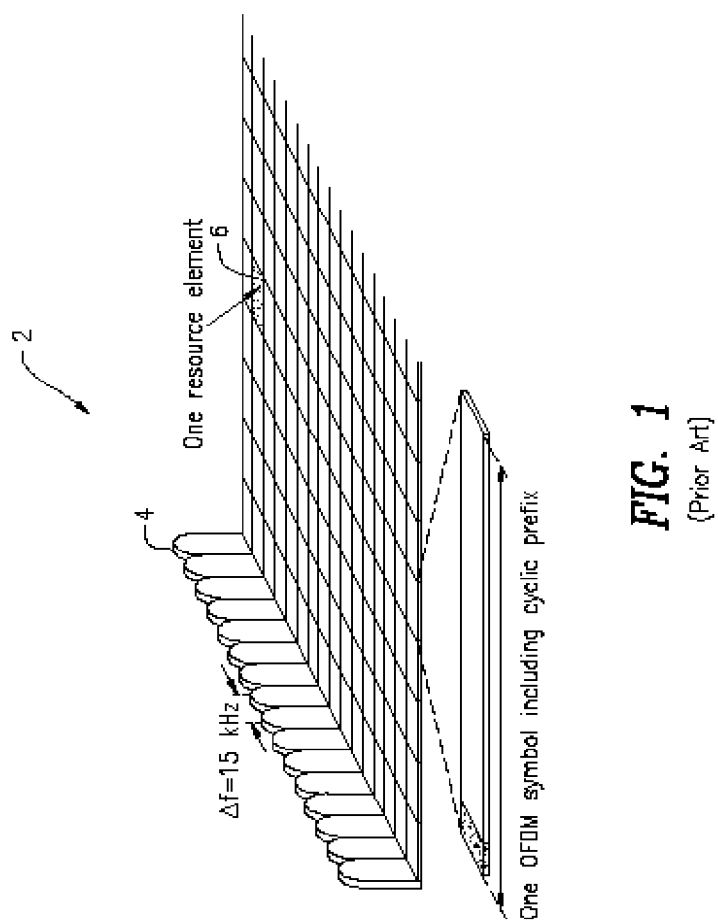
FIG. 1 is a known time-frequency grid showing distribution of resource elements.
Figure 2:
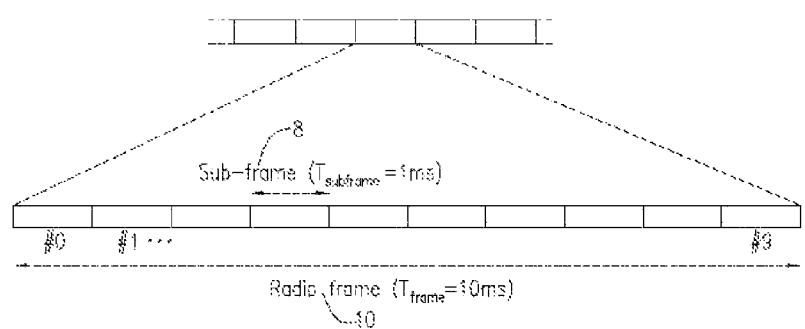
FIG. 2 is a diagram of known frames and sub frames for organization of data in the time domain.
Figure 3:
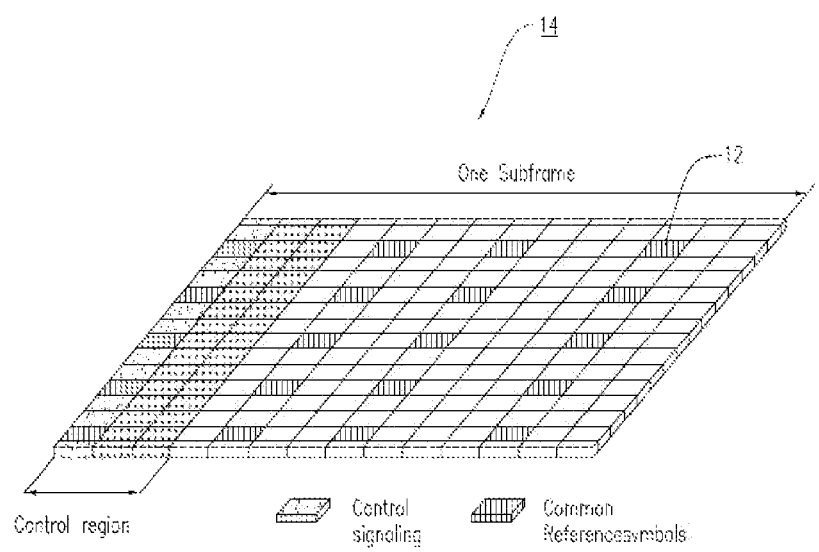
FIG. 3 is diagram of a known single sub frame including common reference symbols (signals) for transmission to a user equipment (UE)

Before describing in detail exemplary embodiments that are in accordance with the present invention, it is noted that the embodiments reside primarily in combinations of apparatus components and processing steps related to robust transmission on a discontinuous transmission carrier in a wireless communication system. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 6:
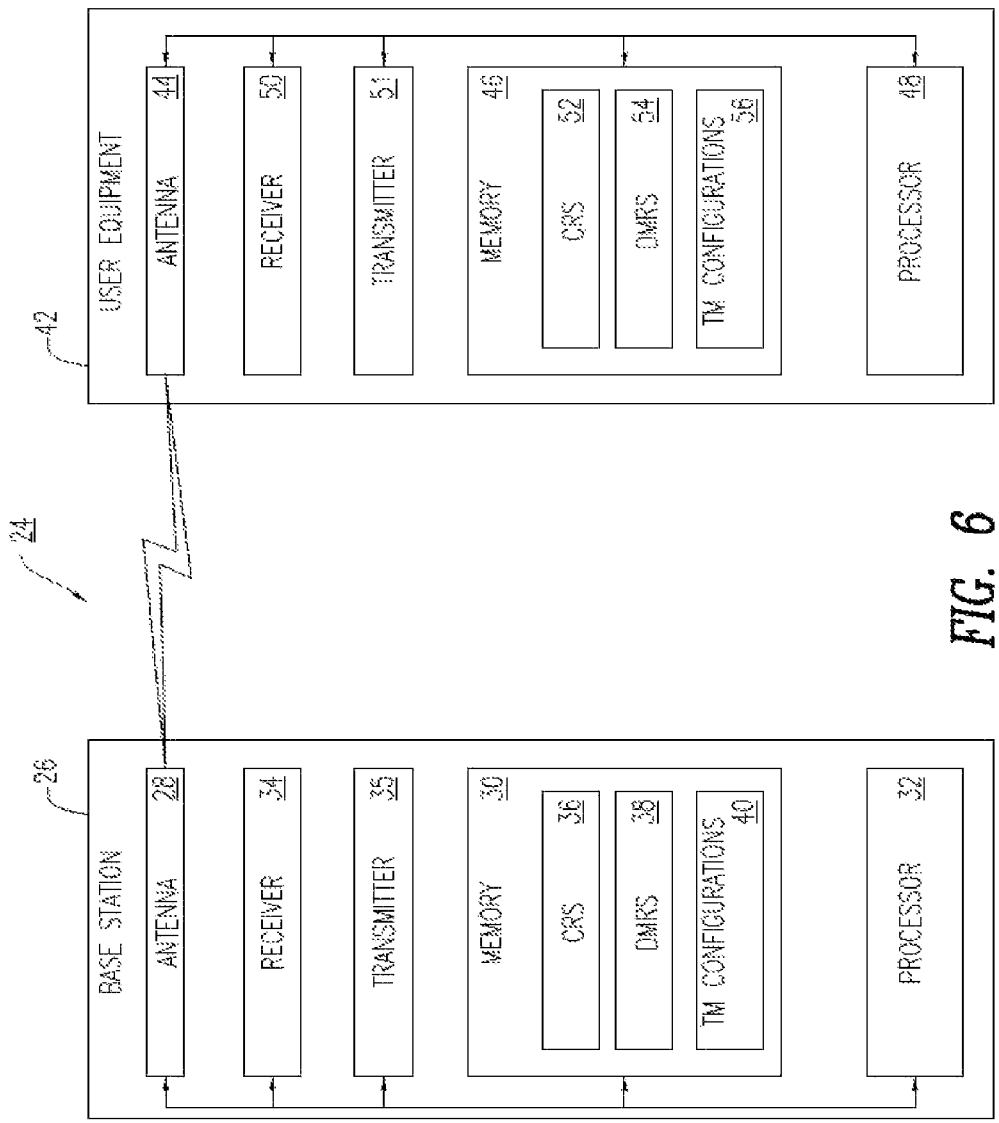
FIG. 6 is a block diagram of a wireless communication system constructed in accordance with principles of the present invention.

FIG. 6 shows an exemplary base station 26 and a UE 42 constructed in accordance with principles of the present invention, for providing discontinuous transmission and limited CRS in conjunction with transmit diversity and open loop MIMO, as described below. The base station 26 includes an antenna 28, a memory 30, a processor 32, a receiver 34 and a transmitter 35. In an alternative embodiment, the receiver 34 and transmitter 35 may be combined into a single unit, e.g., a transceiver. The memory 30 stores information to be transmitted in a subset of sub frames to a UE. The information includes a CRS 36 and transmission mode configuration information 40. The information may also include a DMRS 38. The processor 32 is configured to select a transmission mode from a plurality of transmission modes that includes one of a transmit diversity mode and an open loop MIMO mode. The processor 32 is also configured to include in the discontinuous transmission at least one CRS in only a pre-determined subset of sub frames and in additional sub frames where there is transmission of data using a selected transmission mode. The transmitter 35 is configured to transmit data and CRS discontinuously in sub frames according to a selected transmission mode, the discontinuous transmission omitting transmission of data and CRS in specified sub frames.

In some embodiments, the transmission mode is TM2 or TM3, as defined for long term evolution (LTE). The base station 26 may further be configured to signal the UE as to which sub frames contain the CRS 36. The base station 26 may further be configured to transmit a signal indicating to the UE which one of CRS 36 or CSI-RS are to be used for channel state information feedback. The base station 26 may further be configured to signal the UE to receive in a discontinuous mode. The base station 26 may further notify the UE whether CRS 36 used for demodulation is present in each physical resource block (PRB) pair or occupies the whole system bandwidth of a current sub frame. The base station 26 may further be configured to transmit a default CRS-RS and IMR to enable the UE to perform CSI measurement and provide CSI feedback for transmission modes that use CRS 36 for demodulation.

The UE 42 includes antenna 44, a memory 46, a processor 48, a receiver 50 and a transmitter 51. In some embodiments, the receiver 50 and the transmitter 51 may be combined into a single transceiver unit. The memory 46 is configured to store information received from the base station 26. The information includes a CRS 52 and transmission mode configuration information 56. The information may also include a DMRS 54. The transmission mode configuration information 56 is selected from a plurality of transmission modes that include at least one of a transmit diversity mode and an open loop MIMO mode. The receiver 50, is configured to receive discontinuous transmissions including the stored CRS 52 in a selected subset of sub frames. The processor 48 is configured to perform channel estimation based on one of CRS and channel state information reference symbols, CSI-RS, to perform channel estimation.

Embodiments allow a CRS based transmission mode to be used and still support DL DTX in cell. The CRS based transmission modes particularly contain modes for transmit diversity and open loop MIMO with up to four layers. These robust transmission schemes do not exist for UE specific RS based transmission modes. This has an advantage for systems where the CSI-RS periodicity is longer (to maximize the DL DTX benefits) or at high UE speeds leading to higher UE throughput and ultimately increased cell throughputs.

The processor 48 of the UE 42 may further be configured to perform channel state information (CSI) estimation based on at least one of the CRS 52 in the selected subset of sub frames and the CRS 52 is in sub frames where the UE 42 is scheduled to use a CRS-based transmission scheme and where the UE 42 is precluded from CRS-based CSI estimation in other frames. The processor 48 of the UE 42 may further be configured to perform CSI feedback based on CSI-RS when the transceiver 50 is configured to perform demodulation using CRS 52. The processor 48 may further be configured to assume downlink discontinuous transmission and the presence of CRS in the selected subset of frames. The UE 42 may further be configured to assume that CRS 52 for channel estimation functions are only in sub frames where the UE 42 has been scheduled. In some embodiments, interpolation of acquired channel estimates using CRS between sub frames is disabled.

Thus, embodiments described herein support CRS-based TMs together with downlink discontinuous transmission (DL DTX). Since new (non-legacy) UEs 42 can operate in DTX mode without CRS in sub frames other than sub frames 0 and 5, the network can rapidly switch off all transmissions in some sub frames, when there are no legacy UEs 42 in a cell. To support this configuration, a UE 42 enters a DL DTX operating mode which implies that the UE 42 may only use CRS 52 in a limited set of sub frames for estimating parameters in the channel analyzer, or in channel interpolation between sub frames. For example, the channel analyzer assumes only the CRS 52 in sub frame 0 and 5 is available for parameter estimation.

With a DL DTX operating mode combined with sub frames where CRS 52 estimates are valid, a UE 42 is not limited to the discussed eTM10, but can be configured in any transmission mode, including TM2 and TM3. For example, a UE 42 may be configured in TM3 (or an enhanced TM3), and use CRS 52 within the scheduled sub frame (for example, sub frames 0 and 5) for channel estimation and demodulation. However, unlike prior art configurations, the UE 42 herein may only utilize CRS 52 in sub frames 0 and 5 for QCL assumptions, parameter estimation for the channel analyzer and channel interpolation across non-CRS sub frames. For example, a UE 42 may be configured with TM3 with DL DTX and scheduled in sub frame 1, and then use channel interpolation across sub frames 0 and 1 to improve CRS channel estimations. However, CRS 52 in sub frames where the UE 42 has not been scheduled in the past may not be used by the UE 42 operating in DL DTX mode, since the UE 42 cannot reliably know whether the CRS 52 is present there or not.

Thus, a UE 42 configured in any transmission mode, including transmission modes that include transmit diversity and open loop multiple-input-multiple-output (MIMO) modes, and operating according to DL DTX, may only use CRS 52 in sub frames 0 and 5, or additional sub frames where CRS is guaranteed to be transmitted, plus CRS 52 in sub frames where the UE 42 has been scheduled when the UE is performing channel estimation functions such as parameter estimation for the channel analyzer or channel interpolation. Other sub frames for transmitting the CRS 52 can be used, and the UE 42 may be signaled as to which sub frames contain the CRS 52.

In addition, when performing CSI estimation based on CRS 52, the UE 42 may only use CRS 52 in a restricted subset of sub frames when in DL DTX mode, such as sub frames 0 and 5 or in sub frames where the UE 42 has been scheduled to use a CRS based transmission scheme. In other sub frames, the UE 42 may not use the CRS 52 to perform CSI estimation for CSI feedback.

As an additional enhancement, a UE 42 configured in a CRS-based transmission mode (where scheme 1 uses CRS for demodulation, see Table 1), can further be configured to use CSI-RS for channel state information feedback instead of CRS 52. Using CSI-RS has the advantage that CSI can be configured to be measured in sub frames other than 0 and 5, and this may reflect the interference situation for downlink shared data channel more accurately, especially if neighboring cells are also using DL DTX. Thus, in some embodiments, a default CSI-RS can be transmitted with an interference measurement resource (IMR) to allow the UE 42 to perform CSI measurement and provide CSI feedback for transmission modes that use CRS 52 for demodulation. The CSI-RS and IMR may be signaled to the UE 42 in a broadcast control message or may be transmitted in a physical downlink shared channel (PDSCH).

To make the measurements on CSI-RS valid, the UE 42 should assume (and the eNB 26 should ensure) that the corresponding CSI-RS ports and the corresponding CRS ports are equivalent. For instance, the UE 42 may assume that a channel estimated using CSI-RS port 15+x is the same channel as CRS port x for x=0, 1, 2, 3. If this condition is satisfied, use of CSI-RS ports for CQI, rank, and PMI reports in both the aperiodic and periodic feedback modes associated with the configured CRS-based transmission mode may be obtained. A minimum requirement is that the CRS in sub frames 0 and 5 and the scheduled sub frame is QCL with the CSI-RS. Further the UE 42 may assume a transmission mode based on CRS demodulation when deriving the CSI report.

In some embodiments, a UE 42 can be configured in DL DTX mode by higher layer control signaling from a base station 26. One possibility is by using radio resource control (RRC) signaling. Another possibility is signaling in a master information block (MIB) or a system information block (SIB) message, which broadcasts to DL DTX supporting UEs, that this carrier is utilizing DL DTX. Alternatively, the UE 42 may receive such a message during handover signaling when attached to another cell and when performing handover to a cell where DL DTX is used.

A default value of not using DL DTX could be used, so if the UE 42 didn't receive such signaling, the UE 42 would not assume that DL DTX is used. Whenever a UE 42 receives signaling that DL DTX is active on the carrier, the UE 42 may be configured to assume that CRS is only present in sub frames 0 and 5 for channel estimation functions and channel state information feedback functions. In an alternative embodiment, the UE 42 may also use CRS in sub frames where the UE 42 has been scheduled for channel estimation functions such as parameter estimation for the channel analyzer or channel interpolation. In yet a further embodiment, a UE 42 configured to a CRS-based transmission mode (TM1-TM6) may additionally utilize CRS in scheduled sub frames, while UEs configured in UE-specific RS (DMRS) based transmission modes may only utilize CRS in sub frames 0 and 5. In an alternative signaling embodiment, the DL DTX indication signaling is not explicit, but implicit in the configuration of a new transmission mode, such as eTM3, eTM10 or TM11, where the transmission mode, eTM3, is similar to the transmission mode, TM3, except for the suspension of CRS transmissions in sub frames other than sub frames 0 and 5, and CSI measurement and feedback mechanisms. Whenever such a new TM is configured, the UE 42 may assume presence of CRS in sub frames 0 and 5 only (at a minimum). Configuration of the extended or new TM is thus equivalent to the explicit signaling discussed above.

In some embodiments, the UE 42 may assume that when CSI-RS is configured for CSI feedback in a TM that uses CRS 52 for demodulation (TM1-TM6), but operates in DL DTX mode, the PDSCH to RE is mapped around CSI-RS and/or IMR whenever the UE 42 is aware of that CSI-RS and/or IMR is present in the sub frame. This has the advantage that CRS-based transmission modes can be used without large performance loss even though the CSI feedback framework is based on CSI-RS and/or interference measurement resource (IMR). In some embodiments, the UE 42 may use the CSI-RS and CRS jointly for channel estimation purposes whenever they coincide in the same sub frame, to improve the channel estimation performance.

In some embodiments, a UE 42 using a CRS-based transmission mode and that is in a cell using DL DTX mode, disables interpolation of acquired channel estimates using CRS 52, between sub frames. Hence, this is different from known current operation where interpolation is allowed. This has the advantage that CRS can be switched off, dynamically, from sub frame to sub frame, thereby achieving sub frame based DTX. This behavior is then applicable to all the different CRS-based transmission modes that are defined, i.e., TM1-6. Further, the UE 42 may also utilize the same behavior for transmission schemes based on CRS that are available in TM1-10, for instance the fallback scheme 2 in TM9 and TM10.

In some embodiments, a UE 42 using an enhanced CRS-based transmission mode may disable interpolation of acquired channel estimates using CRS in sub frames other than sub frames 0 and 5. This allows the cell to suspend transmission of CRS in these other sub frames and go into a DL DTX mode at any time without additional signaling.

A UE specific signaling may indicate whether the UE 42 is to use CRS or CSI-RS for channel state information feedback. The signaling can use RRC. For aperiodic CSI triggering, the signaling can for example also be determined by a trigger in the DCI message. This trigger can for example correspond to a certain bit combination in the DCI message used to trigger the aperiodic CSI report. For periodic CSI reporting, the UE 42 may be configured with two different CSI reports, where one report is based on the assumption that CRS is always present and a second report assumes CRS can be turned on/off dynamically. For the latter report, only CRS in sub frames 0 and 5 may be used. For both CSI reports, CSI may be derived based on the CSI-RS.

A UE specific signaling may indicate whether the CRS the UE 42 uses for demodulation of the PDSCH is present only in the scheduled PRB pairs or if the UE 42 can assume they are present in the whole system bandwidth of the current sub frame. This signaling may be part of RRC configuration or it may also be signaled dynamically (per sub frame) in a PDCCH or EPDCCH downlink control indication message. Benefits of this signaling include that the CRS is only transmitted in those PRB pairs where it is needed. Further enhancement of the performance may be achieved by allowing CRS to be present in a few neighboring PRBs to the allocated PDSCH transmissions, but not the whole system bandwidth.

As a further embodiment, a UE 42 may assume that the CRS is present in all resource block groups (RBGs) for which the UE 42 is scheduled at least one RB. If there are no UEs relying on CRS for any function in a sub frame, it may be sufficient if the CRS is present in the scheduled PRB pairs only. Otherwise, the CRS may be present in the whole system bandwidth. In this latter case, the UE 42 can also take advantage of this by interpolating the channel estimates using CRS outside the PRB pairs where it has been scheduled to receive PDSCH.

In a cell operating in DL DTX mode, a default CSI-RS and IMR configuration may be provided for UEs 42 to perform CSI measurement and feedback for TMs that use CRS for demodulation as defined in the above embodiments. With this default configuration set, there is no need to transmit the configuration to every UE 42 that may use these TMs. In one option of this embodiment, the default CSI-RS and IMR configuration can be broadcast as part of the system information of the cell.

In another option, the default CSI-RS and IMR configuration can be transmitted in PDSCH, which is scheduled by a PDCCH/EPDCCH associated with a specific radio network temporary identification (RNTI). For instance, the PDCCH/EPDCCH can be associated with (have its CRC scrambled with) an ETMCSI-RNTI (enhanced transmission mode CSI-RNTI), which is monitored by all UEs that may use these enhanced CSI measurement and feedback for the CRS-based TMs.

Figure 7:
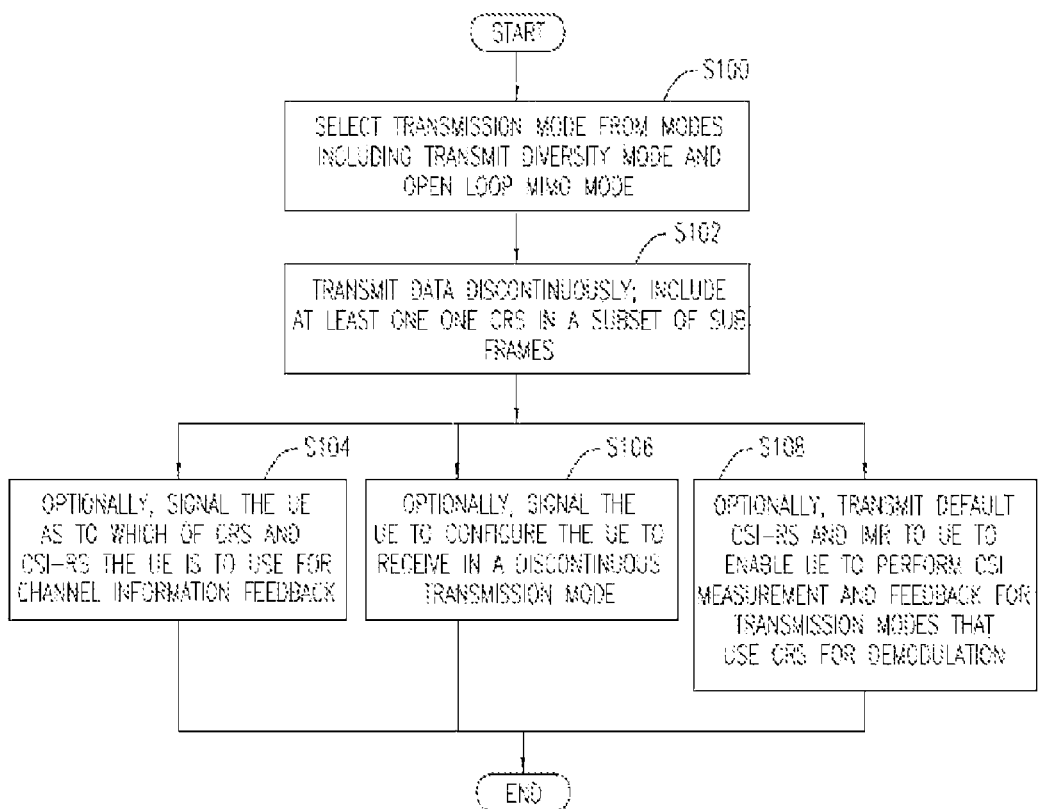
FIG. 7 is a flowchart of a process for transmission of CRS or CSI-RS in a discontinuous transmission system according to principles of the present invention.

In a third option, the default CSI-RS and IMR configuration may be defined as part of an enhanced CRS based transmission mode, e.g., eTM3, as described above. FIG. 7 is a flowchart of a process performed by the base station 26 for transmission of CRS or CSI-RS in a discontinuous transmission. A transmission mode is selected by a base station 26 from a set of transmission modes 40 that include a transmit diversity mode, such as TM2, and an open loop MIMO mode, such as TM3 (step S100). In the selected transmission mode, data and CRS are transmitted discontinuously in sub frames of a frame in accordance with the selected transmission mode, the discontinuous transmission omitting transmission of data and CRS in specified sub frames (step S102). Thus, the discontinuous transmission may include at least one CRS transmitted in only a predetermined subset of the sub frames of the frame and in additional sub frames of the frame where there is transmission of data using a selected transmission one mode. Optionally, a UE 42 may be signaled by the base station 26 as to which of the CRS and CSI-RS is to be used by the UE 42 for channel information feedback (step S104). Optionally, the UE 42 is signaled by the base station 26 to configure the UE 42 to receive in a discontinuous transmission mode (step S106). Optionally, a default CSI-RS and IMR is sent by the base station 26 to the UE 42 to enable the UE to perform CSI measurements and feedback for transmission modes that use CRS for demodulation (step S108).

Figure 8:
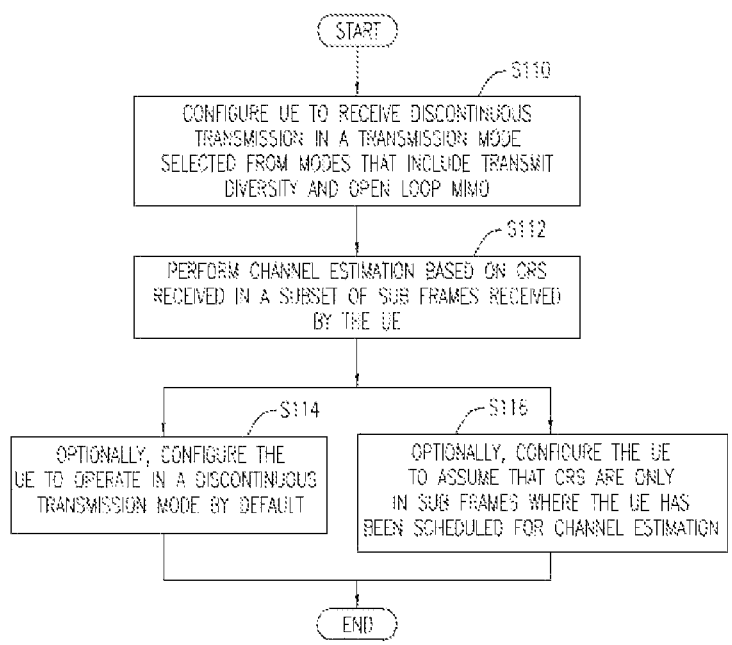
FIG. 8 is a flowchart of a process for reception of a discontinuous transmission and channel estimation according to principles of the present invention.

FIG. 8 is a flowchart of a process performed by the UE 42 for reception of a discontinuous transmission and channel estimation according to principles of the present invention. The UE is configured to store CRS and transmission mode configuration information. The UE 42 is also configured to receive discontinuous transmissions in a transmission mode selected from transmission modes 40 that include transmit diversity, such as used in TM2, and open loop MIMO, such as used in TM3 (step S110). The UE 42 performs channel estimation based on CRS received in a subset of sub frames by the UE 42 (step S112). Optionally, the UE 42 may be configured to operate in a discontinuous transmission mode by default (step S114). Optionally, the UE 42 may be configured to assume that CRS are only in sub frames where the UE 42 has been scheduled for channel estimation (step S116).

Thus, embodiments allow a CRS based transmission mode to be used and still support DL DTX in cell. The CRS based transmission modes particularly contain modes for transmit diversity and open loop MIMO with up to four layers. These robust transmission schemes do not exist for UE specific RS based transmission modes.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, e.g., a node, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. It will be appreciated by persons skilled in the art that the present invention is not limited to what has been particularly shown and described herein above. A variety of modifications and variations are possible in light of the above teachings without departing from the scope of the claims.

What is claimed is:

1. A method in a base station for using common reference symbols, CRS, in conjunction with discontinuous transmission from the base station to a user equipment, UE, the method comprising:
    selecting a transmission mode, the selection being one of a plurality of transmission modes that include at least one of a transmit diversity mode and an open loop multiple-input-multiple-output, MIMO, mode;
    transmitting data and CRS discontinuously in sub frames of a frame in accordance with the selected transmission mode, the discontinuous transmission omitting transmission of data and CRS in specified sub frames;
    including in the discontinuous transmission at least one CRS, the CRS being transmitted in only a pre-determined subset of the sub frames of the frame and in additional sub frames of the frame where there is transmission of data using a selected transmission mode; and
    signaling the UE as to which of one of two reference symbol types the UE is to use for channel state information feedback, the first type being CRS and the second type being channel state interference reference symbols, CSI-RS.

2. The method of claim 1, wherein the selected transmission mode, TM, is one of TM2 and TM3 defined for long term evolution, LTE.

3. The method of claim 1, further comprising signaling the UE, to inform the UE as to which sub-frames contain the CRS.

4. The method of claim 1, further comprising signaling the UE to configure the UE to receive in a discontinuous transmission mode.

5. The method of claim 1, further indicating to a UE whether CRS to be used for demodulation is present in one of each scheduled physical resource block, PRB, and a whole system bandwidth of a current sub frame.

6. The method of claim 1, further comprising transmitting a default channel state information reference symbol, CSI-RS, configuration and an interference measurement resource, IMR, configuration to allow the UE to perform CSI measurement and allow the UE to provide CSI feedback for transmission modes that use CRS for demodulation.

7. The method of claim 6, wherein the default CSI-RS and IMR configurations are signaled in a broadcasted control message.

8. The method of claim 6, wherein the default CSI-RS and IMR configurations are transmitted in a physical downlink shared channel, PDSCH.

9. A base station for downlink discontinuous transmission, the base station comprising:
    a memory configured to store a common reference symbol, CRS and transmission mode configuration information;
    a transmitter configured to transmit data and CRS discontinuously in sub frames in accordance with a selected transmission mode, the discontinuous transmission omitting transmission of data and CRS in specified sub frames; and
    a processor configured to:
        select a transmission mode from a plurality of transmission modes that include at least one of a transmit diversity mode and an open loop multiple-input-multiple-output, MIMO, mode;
        include in the discontinuous transmission at least one CRS, the CRS being transmitted in only a pre-determined subset of the sub frames and in additional sub frames where there is transmission of data using a selected transmission mode; and
    the transmitter being further configured to transmit a signal indicating to a user equipment, UE, which one of CRS and channel state information reference symbols, CSI-RS, are to be used for channel state information feedback.

10. The base station of claim 9, wherein the selection of the transmission mode, TM, is one of TM2 and TM3 defined for long term evolution, LTE.

11. The base station of claim 9, wherein the base station is further configured to signal a user equipment, UE, to inform the UE as to which sub frames contain the CRS.

12. The base station of claim 9, wherein the base station is further configured to signal a user equipment, UE, to configure the UE to receive in a discontinuous transmission mode.

13. The base station of claim 9, wherein the base station indicates to a user equipment, UE, whether CRS to be used for demodulation is present in one of each scheduled physical resource block, PRB, pair and a whole system bandwidth of a current sub frame.

14. The base station of claim 9, wherein the base station is further configured to transmit a default channel state information reference symbol, CSI-RS, and an interference measurement resource, IMR, to allow the user equipment, UE, to perform CSI measurement and provide CSI feedback for transmission modes that use CRS for demodulation.

15. A method at a user equipment, UE, for reception of discontinuous transmission from a base station, the method comprising:
    storing common reference symbols, CRS, and transmission mode configuration information, a transmission mode being selected from a plurality of transmission modes that include at least one of a transmit diversity mode and an open loop multiple-input-multiple-output, MIMO, mode;
    receiving discontinuous transmissions that include the stored CRS in a selected subset of sub frames;
    performing channel estimation based on one of CRS and channel state information symbols, CSI-RS;
    performing channel state information, CSI, feedback based on CSI-RS; and
    performing demodulation using CRS.

16. The method of claim 15, further comprising:
    performing channel state information, CSI, estimation based on at least one of the CRS in the selected subset of sub frames and the CRS in sub frames where the UE is scheduled to use a CRS based transmission scheme; and
    precluding the UE from CRS-based CSI estimation in other sub frames.

17. The method of claim 15, further comprising assuming downlink discontinuous transmissions and presence of CRS in the selected subset of sub frames.

18. The method of claim 15, further comprising assuming that CRS for channel estimation functions are only in sub frames where the UE has been scheduled.

19. The method of claim 15, wherein interpolation of acquired channel estimates using CRS between sub frames is disabled.

20. A user equipment, UE, for reception of discontinuous transmissions from a base station, the UE comprising:
    a memory configured to store common reference symbols, CRS, and transmission mode configuration information, a transmission mode being selected from a plurality of transmission modes that include at least one of a transmit diversity mode and an open loop multiple-input-multiple-output, MIMO, mode;
    a receiver configured to receive discontinuous transmissions, the discontinuous transmissions including the stored CRS in a selected subset of sub frames;
    a processor configured to perform channel estimation based on one of CRS and channel state information reference symbols, CSI-RS, and
    the processor being further configured to perform channel state information, CSI, feedback based on CSI-RS when the receiver is configured to perform demodulation using CRS.

21. The UE of claim 20, wherein the processor is further configured to perform channel state information, CSI, estimation based on at least one of the CRS in the selected subset of sub frames and the CRS in sub frames where the UE is scheduled to use a CRS based transmission scheme, and wherein the UE is precluded from CRS-based CSI estimation in other sub frames.

22. The UE of claim 20, wherein the processor is further configured to assume downlink discontinuous transmissions and presence of CRS in the selected subset of sub frames.

23. The UE of claim 20, wherein the UE is further configured to assume that CRS for channel estimation functions are only in sub frames where the UE has been scheduled.

24. The UE of claim 20, wherein interpolation of acquired channel estimates using CRS between sub frames is disabled.

* * * * *

UNITED STATES PATENT AND TRADEMARK OFFICE
CERTIFICATE OF CORRECTION

PATENT NO. : 9,468,037 B2
APPLICATION NO. : 14/354901
DATED : October 11, 2016
INVENTOR(S) : Cheng et al.

Page 1 of 2

It is certified that error appears in the above-identified patent and that said Letters Patent is hereby corrected as shown below:

On the Title Page

Under "Assistant Examiner", in Column 2, Line 1, delete "Ronald h" and insert -- Ronald H --, therefor.

In the Figure, for Step "S102", in Line 2, delete "ONE ONE" and insert -- ONE --, therefor.

On Page 2, in Item (56), under "OTHER PUBLICATIONS", in Column 2, Line 1, delete "DATX" and insert -- DTX --, therefor.

On Page 2, in Item (56), under "OTHER PUBLICATIONS", in Column 2, Line 6, delete "France" and insert -- France, --, therefor.

In the Drawings

Figure 4:
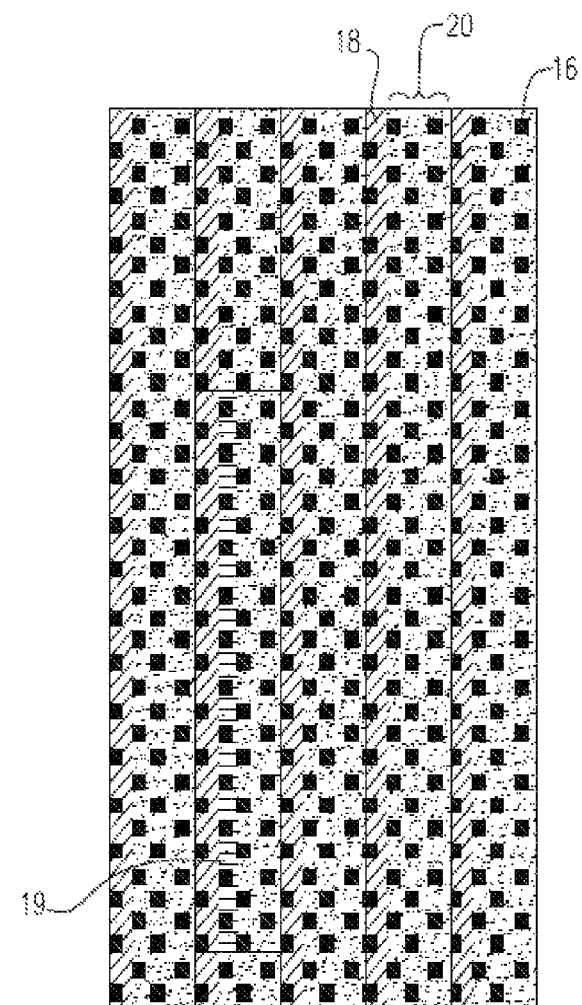
FIG. 4 is a diagram of a known type A channel for transmission to legacy UEs.
Figure 5:
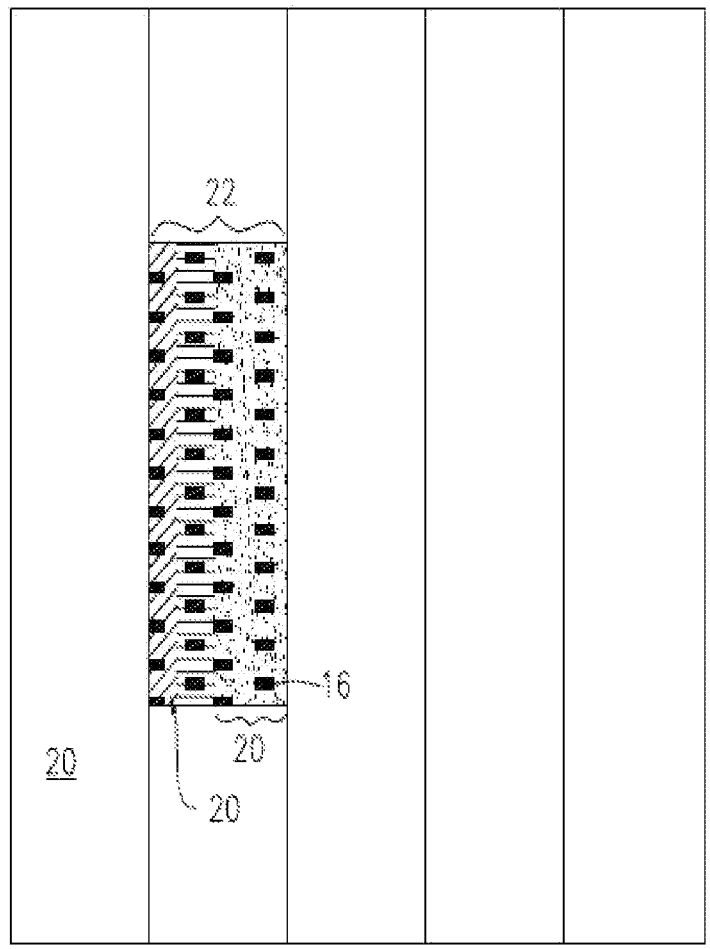
FIG. 5 is a diagram of a known type B channel for transmission to non-legacy UEs.

In Fig. 4, Sheet 4 of 8, delete "eDPCCH)" and insert -- ePDCCH) --, therefor.

In Fig. 7, Sheet 7 of 8, for Step "S102", in Line 2, delete "ONE ONE" and insert -- ONE --, therefor.

In the Specification

In Column 1, Line 25, delete "Tsubframe" and insert -- T subframe --, therefor.

In Column 1, Line 40, delete "physical" and insert -- physical downlink --, therefor.

In Column 1, Line 42, delete "automated" and insert -- automated repeat --, therefor.

In Column 2, Line 16, delete "symbols" and insert -- signals --, therefor.

In Column 2, Line 36, delete "multi-broadcast" and insert -- multicast-broadcast --, therefor.

Signed and Sealed this
Twenty-eighth Day of November, 2017

Joseph Matal
*Performing the Functions and Duties of the
Under Secretary of Commerce for Intellectual Property and
Director of the United States Patent and Trademark Office*

In Column 3, Line 58, delete "3 GPP" and insert -- 3GPP --, therefor.

In Column 3, Line 66, delete "PBR" and insert -- PRB --, therefor.

In Column 5, Line 17, delete "eDPCCH)." and insert -- ePDCCH). --, therefor.

In Column 7, Lines 49-50, delete "interference" and insert -- information --, therefor.

In Column 9, Line 41, delete "is" and insert -- is a --, therefor.

In Column 9, Line 47, delete "UEs; and" and insert -- UEs; --, therefor.

In Column 14, Line 27, delete "CRC" and insert -- CRS --, therefor.

In Column 14, Line 34, delete "FIG. 7" and insert the same at Line 35, before "is" as a new paragraph.

In the Claims

In Column 16, Line 2, in Claim 1, delete "interference" and insert -- information --, therefor.

In Column 16, Line 33, in Claim 9, delete "CRS" and insert -- CRS, --, therefor.

In Column 16, Line 41, in Claim 9, delete "to;" and insert -- to: --, therefor.